Patented Feb. 25, 1936

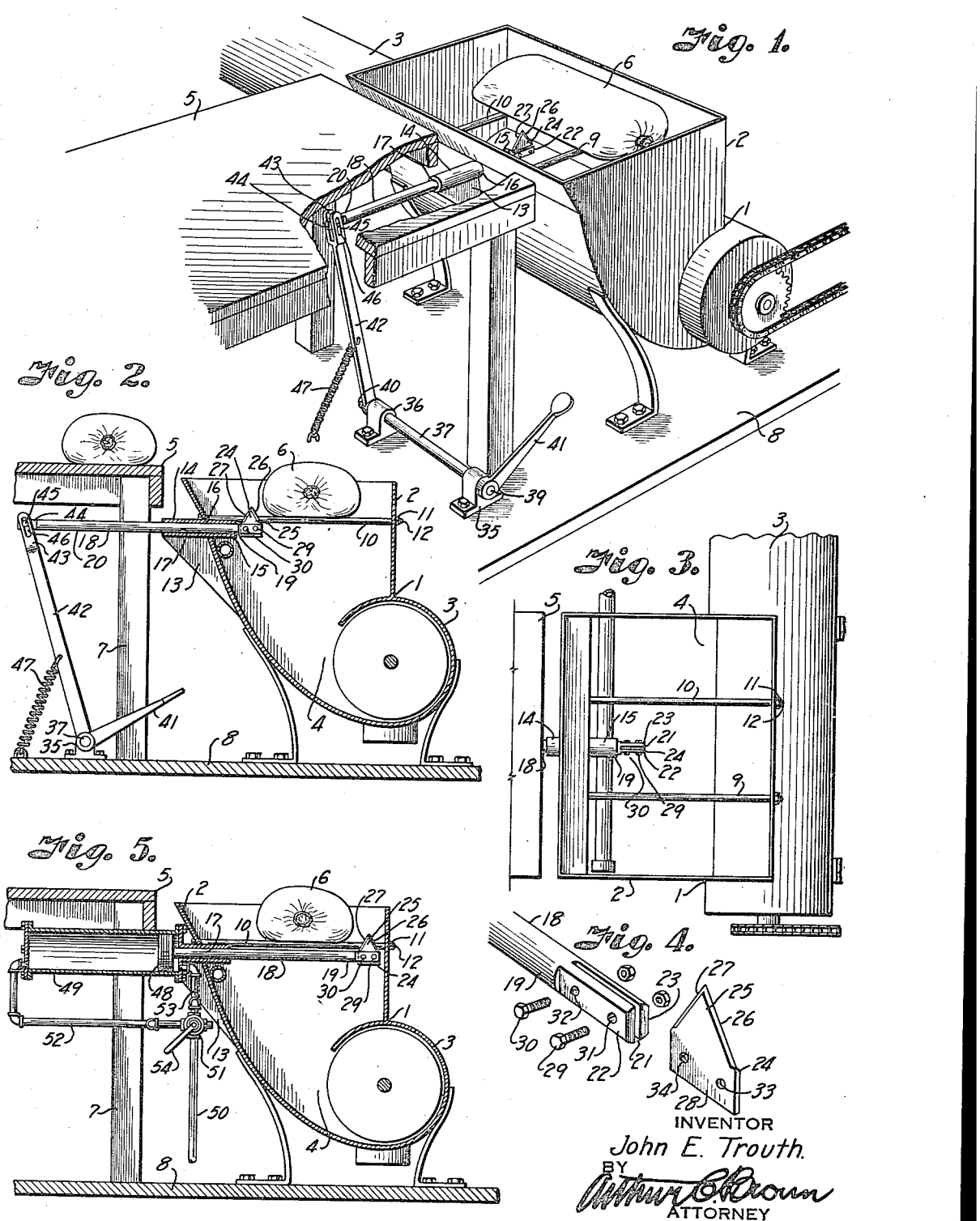

2,031,869

UNITED STATES PATENT OFFICE 2,031,869

MECHANISM FOR EMPTYING CONTAINERS

John E. Trouth, Gladewater, Tex.

Application March 19, 1934, Serial No. 716,351

11 Claims. (Cl. 214—1)

This invention relates to a mechanism for emptying containers, and more particularly the contents of paper cement sacks into the hopper of a mixing machine, and has for its principal object to provide a simple, efficient mechanism for slitting the sacks while they are supported over the hopper so that all of the cement contained in the sacks is delivered directly into the hopper without waste.

Other important objects of the invention are to provide an improved mounting of the slitting knife independently of chutes, platforms, and the like with which such hoppers are usually associated, thereby reducing the possibility of injury to the operator, and to provide manual means for operating the slitting knife when the sack is in position on the hopper.

In accomplishing these and other objects of the invention, I have provided improved details of structure, the preferred forms of which are illustrated in the accompanying drawing, wherein:

Fig. 1 is a perspective view of a mixing machine equipped with a sack opening mechanism embodying the features of my invention.

Fig. 2 is a vertical section through the hopper of the mixing machine and its associated sack supporting platform showing the sack slitting mechanism in position for slitting the sack that is supported in the hopper.

Fig. 3 is a plan view of the hopper particularly illustrating the sack supports and their relation to the slitting knife.

Fig. 4 is a detail perspective view of the slitting knife and its supporting arm shown in disassembled spaced relation.

Fig. 5 is a vertical section similar to Fig. 2 showing a modified form of the invention.

Referring more in detail to the drawing:

1 designates a cement mixing or like machine including a hopper 2 for delivering a material such as cement into a mixing chamber 3 communicating with the bottom of the hopper through a throat 4. Located adjacent one side of the hopper 2 is a platform 5 for stacking or supporting sacks 6 of cement which are moved thereacross into the hopper, the platform 5 being supported on legs 7 carried on the main platform 8 also supporting the mixing machine.

The open top of the hopper is of substantially rectangular shape and of larger dimensions than the length and width of the sacks 6, as clearly illustrated in Figs. 1 and 2, so that the sacks can be successively moved from the platform 5 directly over the top of the hopper by operators standing on each side of the platform.

In carrying out the present invention, I provide the hopper with a sack supporting means across which the sacks are bridged preparatory to opening by slitting the under side thereof to permit the cement to gravitate through the slit in the hopper as now to be described.

Extending across the hopper are spaced pairs of rods 9 and 10 having their ends supported by opposite walls of the hopper at points spaced below the upper rim thereof a distance substantially equal to the depth of the sacks. In the illustrated instance, the ends of the rods are extended through openings in the walls of the hopper and are retained therein by nuts 11 secured to projecting threaded ends 12 of the rods and engaging the outer face of the hopper walls. The spacing of the rods is such that they form a support at the opposite ends of the sack so that before slitting, the intermediate or unsupported portion of the sack does not tend to sag therebetween.

In other words, the sack is normally self-supported upon the rods in the manner of a truss, but when the sack is slit across its lower side at a point between the supporting rods, the portions of the sack adjacent the sides of the slit give way under the weight of the cement to cause the cement to flow from the sack into the hopper which flow may be promoted by the operators grasping the ends of the sack and raising them upwardly and at the same time slightly shaking the sack so that all of the cement contained in the sack is delivered directly into the hopper.

In order to slit the bottom portion of the sack, I provide a slitting mechanism including a knife which is selectively reciprocated across the hopper under manual control of one of the operators, as now to be described.

Carried by one side of the hopper is a bracket arm 13 having a tubular bearing portion 14 extending laterally from the outer face of the hopper wall and an aligning tubular bearing portion 15 projecting through an opening 16 in the hopper wall and into the hopper, as clearly illustrated in Fig. 2. Slidably mounted in the bore 17 of the tubular bearing portions is a rod 18 having its forward end 19 extending into the hopper and its rear end 20 under the platform 5. The forward end of the rod is provided with a vertical slot 21 and flattened side faces 22 and 23 extending in parallel relation with the slot. Mounted in the slot 21 of the rod is a knife blade 24 comprising a blade of substantially the same thickness as the width of the slot and having an upwardly projecting triangular shaped portion 25 provided with cutting edges 26 and 27 that are inclined respectively to the direction of the movement of the rod 18, as later described.

The base portion 23 of the knife is secured in the slot of the rod by fastening devices 29 and 30 extending through openings 31 and 32 in the rod and through aligning openings 33 and 34 in the base of the plate as illustrated in Fig. 4. The upper projecting portion of the knife is of sufficient height so that when the rod is reciprocated to move the knife across the hopper, one of the edges 26 and 27 will be moved in slitting contact with the sack supported in the hopper on the rods 9 and 10, thereby slitting the sack to allow release of its contents into the hopper.

In order to reciprocate the knife carrying rod 18, I provide a manually operable actuating mechanism as now to be described.

Fixed on the main platform 8 are spaced bearings 35 and 36 having their axes extending transversely of the axis of the rod 18 and rotatably mounted therein is a rock shaft 37 having ends 39 and 40 projecting beyond the outer side faces of the bearings to carry a foot pedal 41 and a crank arm 42 respectively. The foot pedal 41 is located in convenient relation to one of the operators, so that he can depress the foot pedal to effect operation of the rock shaft after a sack has been placed on the supporting rods in the hopper, as shown in Fig. 1. The lever arm 42 is fixed to the inner projecting end of the rock shaft at a point in vertical alignment with the rod 18 and has a yoke shaped upper end 43 for straddling a flattened rear end 44 of the rod which is fixed thereto by a pin 45 extending through slots 46 in the yoke and through an opening in the flattened portion of the rod, the slots 46 allowing for arcuate movement of the lever arm 42. The lever arm 42 is normally retained in retracted position by a coil spring 47 having one end secured thereto and its opposite end to the main platform 7.

It is thus apparent that when the operator places his foot on the pedal 41, the lever arm 42 is moved in a clockwise direction, Fig. 2, to reciprocate the rod 18 through the bearing portions 14 and 15 of the supporting bracket for carrying the knife across to the opposite side of the hopper. When the operator releases the foot pedal, the spring 47 will effect automatic return movement of the knife to assure that a slit has been made completely across the width of the sack, the forward edge 26 coming into play when the knife is moved in the forward direction under influence of the foot pedal and the rear edge 27 when the knife is moved in the opposite direction under influence of the spring 47.

In Fig. 5 is shown a modified form of the invention wherein the rod 18 is operated by fluid pressure against the respective sides of a piston 48 that is mounted on the end of the rod and is reciprocable in a cylinder 49 supported by the bracket 13.

Pressure fluid is admitted to the respective ends of the cylinder from a supply conduit 50 having a four-way valve 51 connected with branch conduits 52 and 53 leading to the respective ends of the cylinder, the valve 51 being provided with a lever arm 54 so that it can be actuated by the operator to selectively admit and discharge pressure fluid to the respective ends of the cylinder depending upon the direction that the knife is to be moved.

In operating a sack slitting mechanism constructed as described, sacks of cement 6 are placed upon the platform 5 so that they will be in convenient position for the operators to deliver them successively into the hopper.

The operators at the opposite sides of the platform grasp the sacks at the ends thereof and place them in the hopper with their ends resting on the bars 9 and 10. The operator on the side of the platform having the foot pedal 41 will then effect reciprocation of the knife across the bottom of the sack by applying foot pressure to the pedal 41. When he releases the pressure on the foot pedal the knife will immediately be moved in the opposite direction under influence of the spring 47.

As the sack is slit, the edges of the slit will give way under weight of the cement so that the contents flow therethrough into the hopper. The operators may assist flow of the cement by raising the ends of the sack to depress the center thereof and by slightly shaking or vibrating the sack. After the sack is emptied, it is removed from the bars and another sack is lifted from the platform and placed on the supporting bars in the hopper to continue the operation.

In the form of invention shown in Fig. 5, and assuming that the knife blade is at the forward side of the hopper, as shown, the operator will move the lever arm of the valve 51 to admit fluid on the right hand side of the piston 48 and to cause exhaust of the fluid on the left hand side of the piston so that the knife will be moved from the right to the left across the bottom of the sack.

When the next sack is placed in the hopper, the position of the valve 51 will be changed to cause the knife to move in the reverse direction. If desired, however, the knife may be moved entirely across the hopper and back again upon the opening of each sack in substantially the same manner as in movement of the knife in the preferred form, as illustrated in Figs. 1 and 2.

From the foregoing, it is apparent that I have provided an improved sack opening mechanism whereby paper cement sacks and the like may be readily opened directly over the hopper so as to prevent waste of any of the material contained in the sacks and that the knife is so located that it is not likely to cause injury to either of the operators when they move the sacks into the hopper for the reason that the sack is supported in stationary position when the knife is brought into play.

What I claim and desire to secure by Letters Patent is:

1. In combination with a hopper, a container opening mechanism including supports extending in spaced parallel relation across the hopper for supporting the respective ends of a container, a knife, and means supporting the knife for movement between the supports to slit the intermediate portion of the container.

2. In combination with a hopper, a container opening mechanism including spaced parallel bars extending across the hopper for supporting ends of a container, slitting means, and means supporting the slitting means in the hopper for movement between the bars to slit the container.

3. In combination with a hopper, a container opening mechanism including spaced parallel bars extending across the hopper for supporting ends of a container, slitting means, means supporting the slitting means in the hopper for movement between the bars to slit the container, a lever for actuating the slitting means, and means connecting the slitting means with the lever.

4. A sack slitting mechanism including spaced means for supporting ends of a sack, a knife, means supporting the knife for movement across the sack between said supporting means to slit the sack, and means for actuating the knife to slit the sack.

5. A container slitting mechanism including spaced means for supporting the ends of a container, a knife having oppositely inclined cutting edges, means for supporting the knife for reciprocation between said supporting means, and means for reciprocating the knife to alternately engage the container by said cutting edges.

6. A container slitting mechanism including spaced means for supporting ends of a container, a rod, means mounting the rod for reciprocation between said supporting means, a knife carried by the rod to slit the container, a rock shaft, a lever arm on the rock shaft and connected to the rod, and an actuating lever on the rock shaft.

7. In combination with a hopper, spaced means extending across the hopper for supporting the ends of a container, a rod, means slidably mounting the rod in the hopper between the supporting means, a knife on the rod to slit the container, and means for reciprocating the rod.

8. In combination with a hopper, spaced means extending across the hopper for supporting the ends of a container, a rod slidably carried by the hopper between the supporting means, a knife on the rod to slit the container, a rock shaft, a lever on the rock shaft and connected with the rod, a spring for effecting movement of the rod in one direction, and a lever on the rock shaft for effecting movement of the rod in the opposite direction.

9. In combination with a hopper, spaced means extending across the hopper for supporting the ends of a sack, a rod slidably carried by the hopper between the supporting means, a knife on the rod to slit the sack, a cylinder supported exteriorly of the hopper in line with the rod, a piston slidable in the cylinder and fixed to the rod, and means for alternately supplying pressure medium to opposite ends of the cylinder for effecting reciprocation of the piston.

10. A sack slitting mechanism including spaced supports for supporting opposite ends of a sack laid across said supports with the intermediate portion of the sack freely suspended and unsupported except through the incidental support afforded through said ends of the sack, sack slitting means, means supporting the slitting means for movement between said supports and transversely across the suspended portion of the sack, and means for actuating the slitting means to form a transverse slit in the sack whereby said slit is opened incidental to weight of material contained in the sack to allow discharge of said material.

11. In combination with a hopper, spaced supports extending across the hopper for supporting opposite ends of a sack laid across said supports with the intermediate portion of the sack freely suspended and unsupported except through the incidental support afforded by said ends of the sack, sack slitting means, means supporting the slitting means for movement across the hopper transversely of the unsupported portion of the sack, and means for actuating the slitting means to form a transverse slit in the sack whereby said slit is opened incidental to weight of material contained in the sack to allow discharge of said material into the hopper.

JOHN E. TROUTH.